United States Patent
Kronberger

(10) Patent No.: US 12,123,395 B2
(45) Date of Patent: Oct. 22, 2024

(54) METHOD FOR RETAINING A MOVING PART OF A WIND TURBINE

(71) Applicant: B&R INDUSTRIAL AUTOMATION GMBH, Eggelsberg (AT)

(72) Inventor: Peter Kronberger, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 339 days.

(21) Appl. No.: 17/434,089

(22) PCT Filed: Feb. 26, 2020

(86) PCT No.: PCT/EP2020/054984
§ 371 (c)(1),
(2) Date: Aug. 26, 2021

(87) PCT Pub. No.: WO2020/173978
PCT Pub. Date: Sep. 3, 2020

(65) Prior Publication Data
US 2022/0136483 A1    May 5, 2022

(30) Foreign Application Priority Data

Feb. 27, 2019 (EP) .................................. 19159740

(51) Int. Cl.
*F03D 7/02* (2006.01)
(52) U.S. Cl.
CPC .......... *F03D 7/0204* (2013.01); *F03D 7/022* (2013.01); *F05B 2260/79* (2013.01); *F05B 2270/321* (2013.01)

(58) Field of Classification Search
CPC .... F03D 17/0204; F03D 17/022; F03D 80/80; F03D 7/0204; F03D 7/022; F05B 2260/79; F05B 2270/321
See application file for complete search history.

(56) References Cited

U.S. PATENT DOCUMENTS 10,781,797 B2 * 9/2020 Sørensen ................ F16C 17/10
12,012,930 B2 * 6/2024 Deshpande ........... F03D 7/0224
(Continued)

FOREIGN PATENT DOCUMENTS

CN    1437683    8/2003
CN   103354882   10/2013
(Continued)

OTHER PUBLICATIONS

International Search Report (Form PCT/ISA/210) conducted in Int'l Appln. No. PCT/EP2020/054984 (Apr. 30, 2020).
(Continued)

*Primary Examiner* — Sang K Kim
(74) *Attorney, Agent, or Firm* — GREENBLUM & BERNSTEIN, P.L.C.

(57) ABSTRACT

In order to enable a moveable part of an adjusting device of the wind power plant to be held securely on a wind power plant, drive axles are tensioned against each other prior to the holding action, by at least one drive axle being rotated relative to the other drive axles, and by maintaining a tension of the drive axles achieved at the beginning of the holding action by control of the drive axles and by implementing a position control of the drive axles, which controls the drive axles to the respective starting positions of the drive motors of the drive axles at the beginning of the holding action.

10 Claims, 4 Drawing Sheets

(56) References Cited

U.S. PATENT DOCUMENTS

Figure 1:
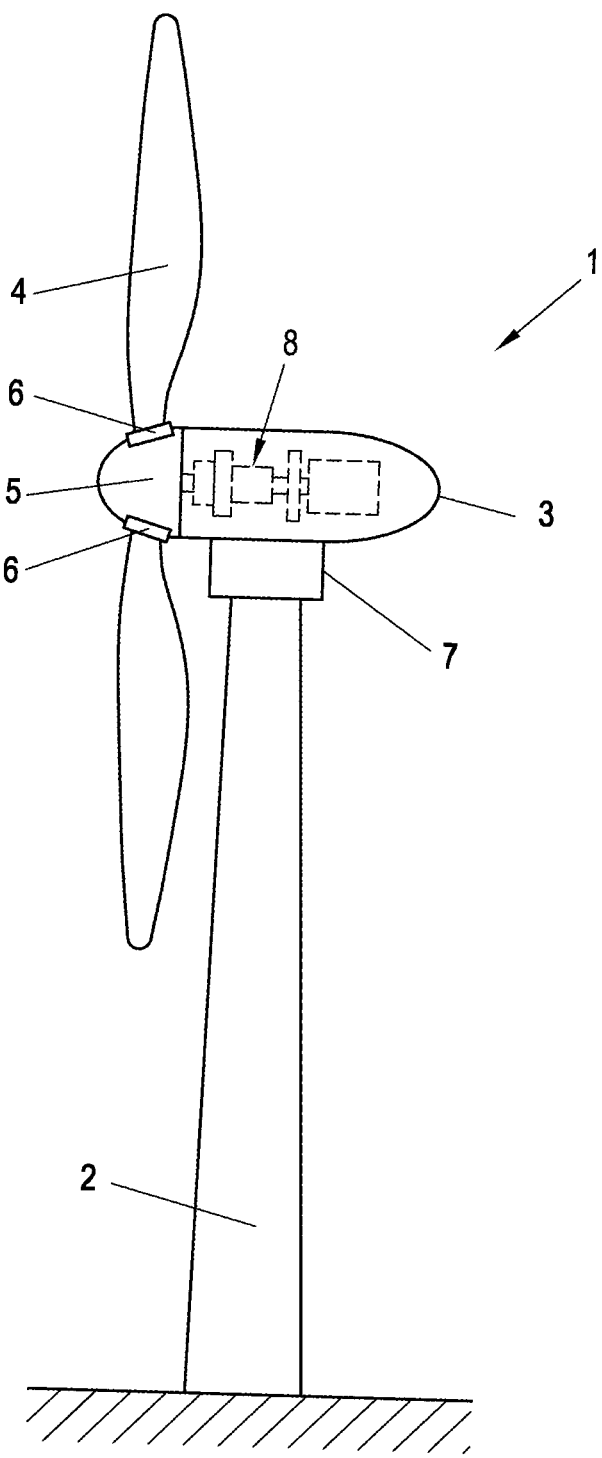

| | | | |
|---|---|---|---|
| 2009/0232652 A1 | 9/2009 | Keller et al. | |
| 2011/0138945 A1* | 6/2011 | Watanabe | F16H 57/12 |
| | | | 74/409 |
| 2018/0372071 A1* | 12/2018 | Müller | F03D 7/0248 |
| 2023/0110951 A1* | 4/2023 | Chacon | F03D 7/0244 |
| | | | 290/44 |

FOREIGN PATENT DOCUMENTS

| | | | | |
|---|---|---|---|---|
| CN | 106460781 | | 2/2017 | |
| CN | 101122277 | | 2/2018 | |
| DE | 102017104474 | | 9/2018 | |
| EP | 2 495 435 | | 9/2012 | |
| EP | 2796710 | | 10/2014 | |
| EP | 2495435 B1 * | 10/2015 | | F03D 7/0224 |
| EP | 3 306 077 | | 4/2018 | |
| WO | 2018/091144 | | 5/2018 | |

OTHER PUBLICATIONS

International Written Opinion (Form PCT/ISA/237) conducted in Int'l Appln. No. PCT/EP2020/054984 (Apr. 30, 2020).

Europe Search Report and Office Action conducted in counterpart Europe Appln. No. EP 19159740 (Aug. 19, 2021).

China Office Action conducted in counterpart China Appln. No. 202080016982.7 (Apr. 27, 2023).

India Office Action conducted in counterpart India Appln. No. 202117040397 (Jan. 4, 2023).

* cited by examiner

METHOD FOR RETAINING A MOVING PART OF A WIND TURBINE

The present invention relates to a method for holding a movable part of a wind power plant having an adjusting device, the adjusting device comprising at least two drive axles, each with a drive motor, which are mechanically coupled to the movable part, wherein the drive axles are tensioned against each other before the holding action by at least one drive axle being rotated relative to the other drive axles, and a tension of the drive axles achieved at the beginning of the holding action is maintained by means of controlling the drive axles. The invention also relates to a wind power plant having such an adjusting device for holding a movable part.

Wind power plants generally have adjusting devices for various movable parts of the wind power plant, such as a rotor blade adjustment mechanism or an azimuth adjustment mechanism, in order to adapt the wind power plant to changing wind conditions (windspeed, wind direction, etc.) and thus, inter alia, to be able to increase the energy output. Such adjusting devices often have several smaller interacting drive motors instead of a single large drive motor. The drive motors usually act on a common ring gear via a drive pinion in order to adjust the movable part of the wind power plant. In this case, the ring gear is often arranged in a stationary position—for example, on the tower in the case of an azimuth adjustment mechanism, or on the hub of a nacelle (as a quasi-stationary part) for a rotor blade adjustment mechanism. The drive motors with the drive pinion are arranged on the movable part. However, this arrangement can also be reversed. The movable part and the stationary part are in this case connected to each other via a bearing—either a roller bearing or a plain bearing. Between the drive motor and drive pinion there is usually also a drive transmission, often a planetary gearing, which functions as a torque converter—that is, the high rotation speed and the low torque of the drive motor are converted into high torque and low speed in the drive pinion. In addition, a braking device, usually an adjusting brake which is most commonly hydraulic, is frequently provided—in particular, where a roller bearing is used—in order to be able to brake or hold the movable part of the wind power plant. In cases where a plain bearing is used, typically no (most commonly, hydraulic) braking device is provided. A stationary brake ring can be provided in the braking device, with brake shoes arranged on the movable part acting on said brake ring. This arrangement can be reversed as well. Additionally or alternatively, the drive motors can also be equipped with holding brakes.

There is a great deal of mechanical play and high elasticity in a drive axle of an adjusting device of a wind power plant—that is, a drive motor, optionally a drive transmission, and the toothing between the drive pinion and ring gear. For example, play in the range of 0.5 mm to 1 mm is not uncommon between the teeth of the drive pinion and the ring gear. In addition, the drive axle has high ratios, typically on the order of 1:20,000. It is necessary to first overcome the play and elasticities in the drive axle to transmit torque from the drive motor to the ring gear. This may require many revolutions of the drive shaft of the drive motor.

When no adjustment is required, the movable part of the adjusting device is usually held by an adjusting brake and/or by holding brakes of the drive motors and/or by the prevailing friction in a plain bearing. The braking effect that can be achieved for the holding action can worsen due to wear in the adjusting brake or holding brake or in the plain bearing. The wind load may also get so high that the braking effect that can be achieved is insufficient to hold the moveable part. In both cases, wind can lead to an undesired uncontrolled rotation of the moveable part overcoming the braking effect.

It is also already known from WO 2018/091144 A1 and EP 2 495 435 A1 to use the drive axles to hold the movable part of the adjusting device, for which purpose a speed controller of the drive axles is used in both cases. However, in the event of high wind loads, such a speed controller alone cannot prevent an undesired uncontrolled rotation of the moveable part overcoming the holding action of the drive axles.

It is therefore an object of the present invention to specify a method and a wind power plant which enable a movable part of an adjusting device to be held more securely.

This object is achieved according to the invention in that a position control is used to hold the drive axles in the starting positions at the beginning of the holding action. As long as the tension is maintained by controlling the drive axles, the moveable part is held. The drive axles are thus actively used to hold the movable part of the adjusting device. As a result of the control, the moveable part is held solely by the drive axles or, any existing braking effect is supported by the drive axles for holding the moveable part. Controlling the drive axles in order to maintain the tensioning compensates for any worsening of an existing braking effect attributed to possible wear. Likewise, the adjusting brake can also be made smaller, because at least part of the braking effect for the holding action can be provided by the drive axles. The tension is maintained by the position control. At the same time, rotation of the moveable part is compensated for, for example, if the moveable part rotates unintentionally during the holding action due to excessive wind loads.

For the holding action, it is particularly advantageous if the drive axles are retensioned again before the holding action, because in this way any undesired changes in the state of tension are compensated for, which ensures particularly good and secure holding.

Figure 2:
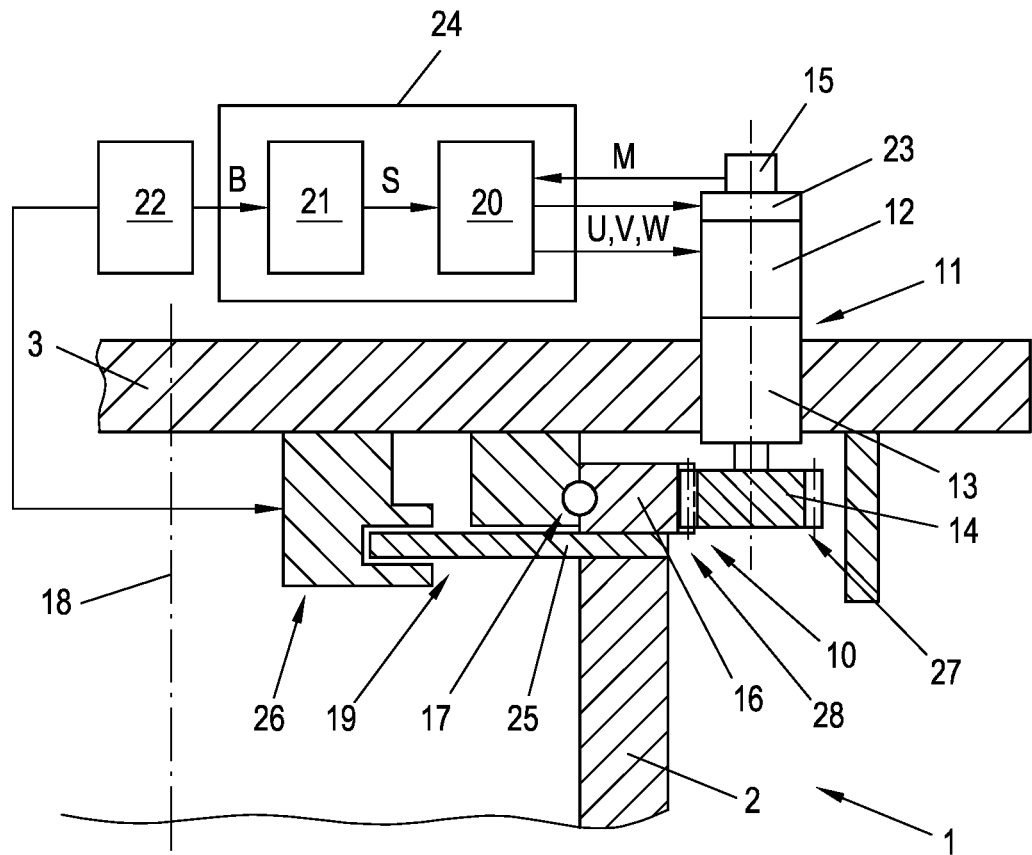
Figure 3:
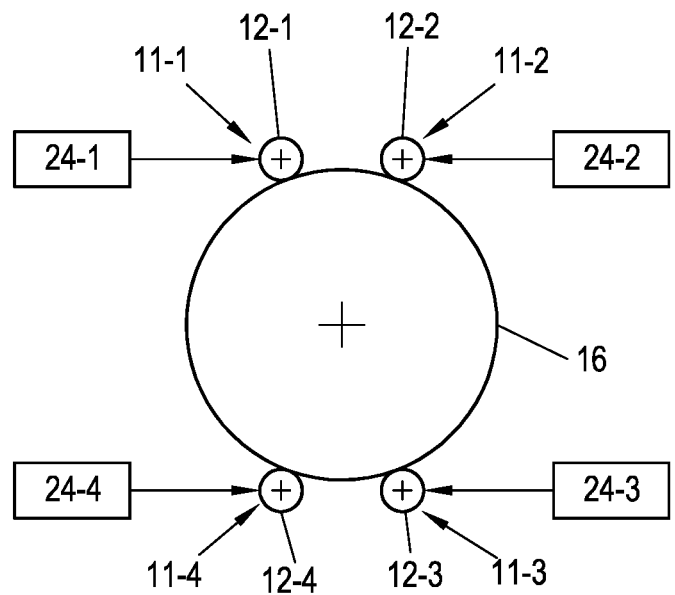
Figure 4:
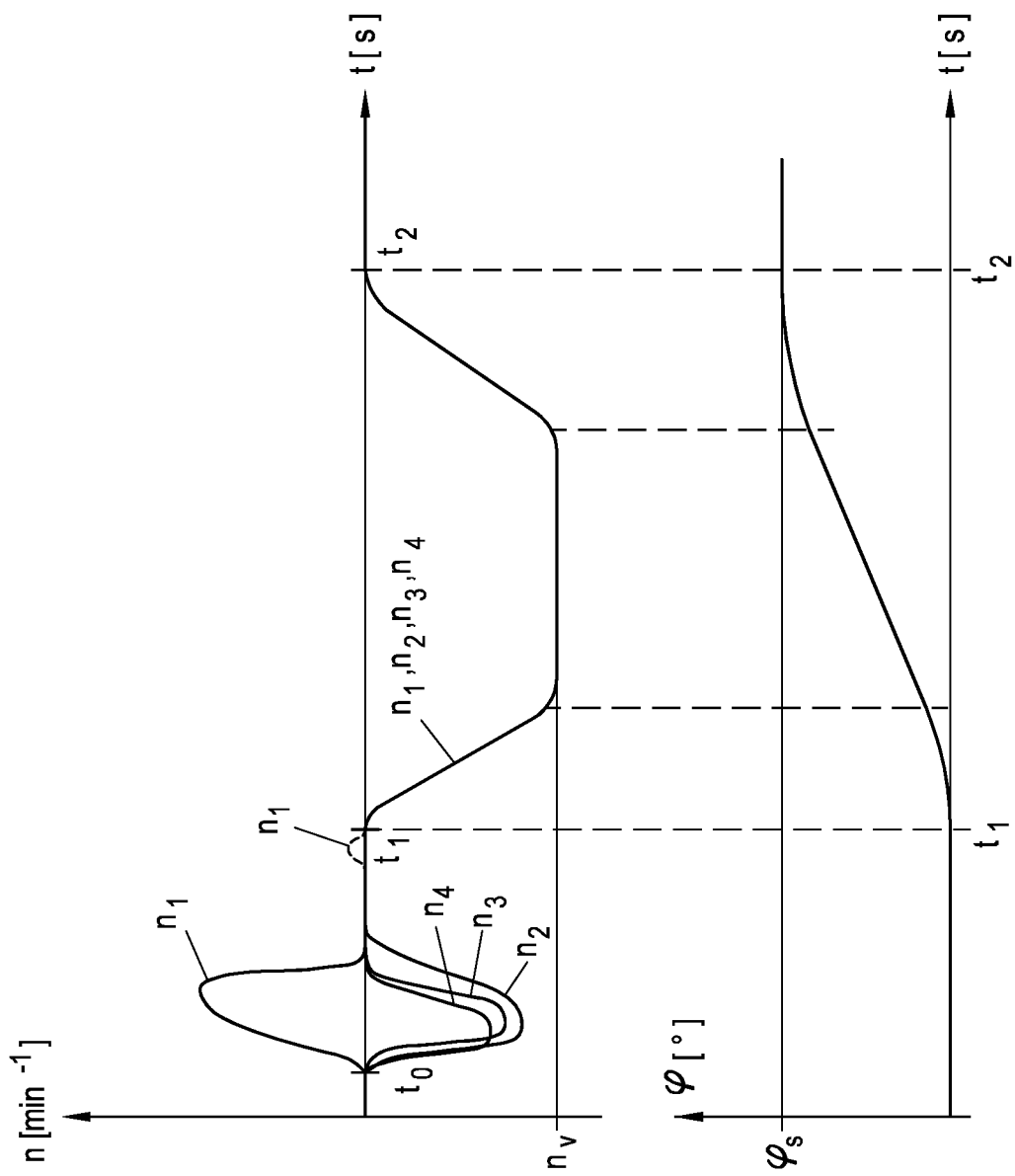
Figure 5:
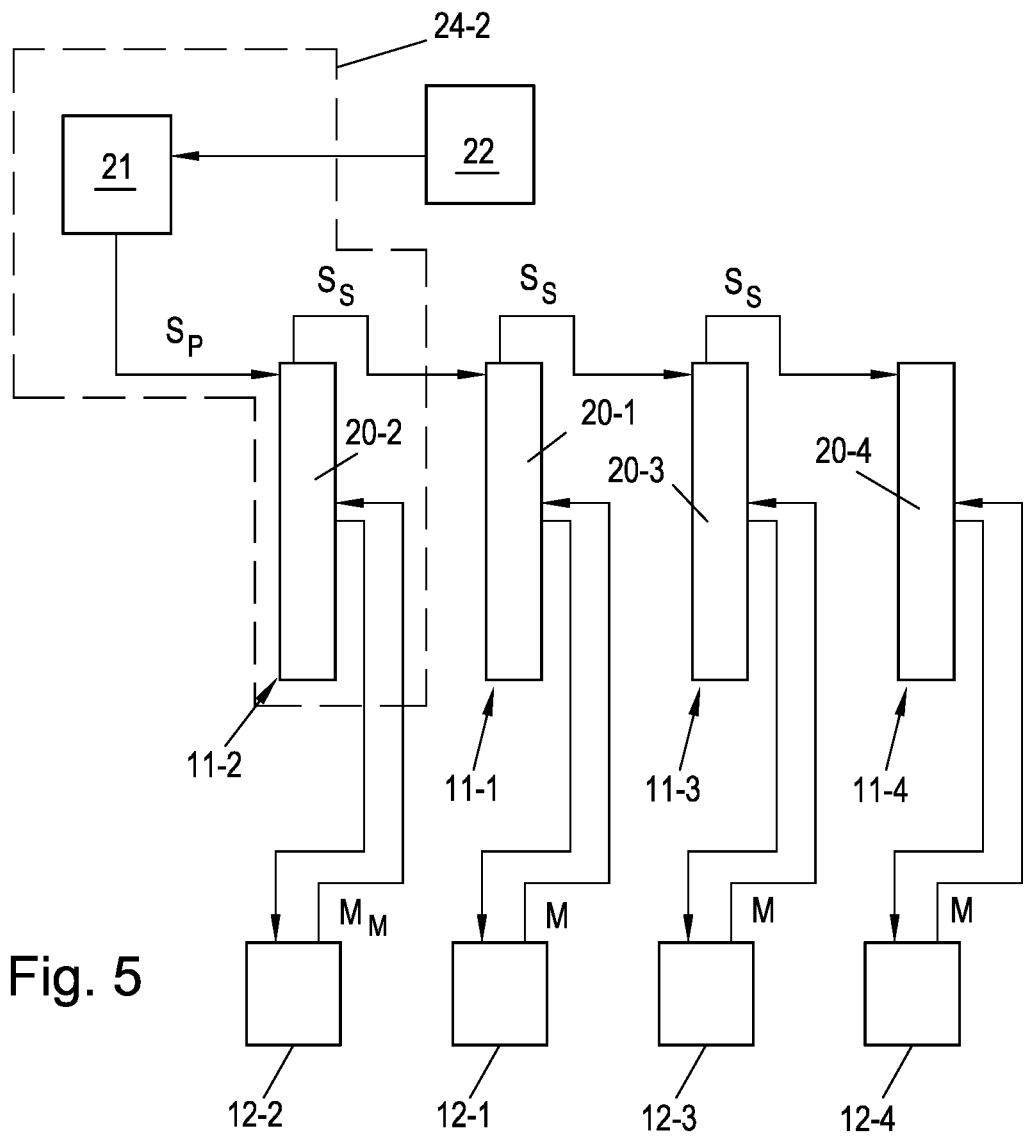
Figure 6:
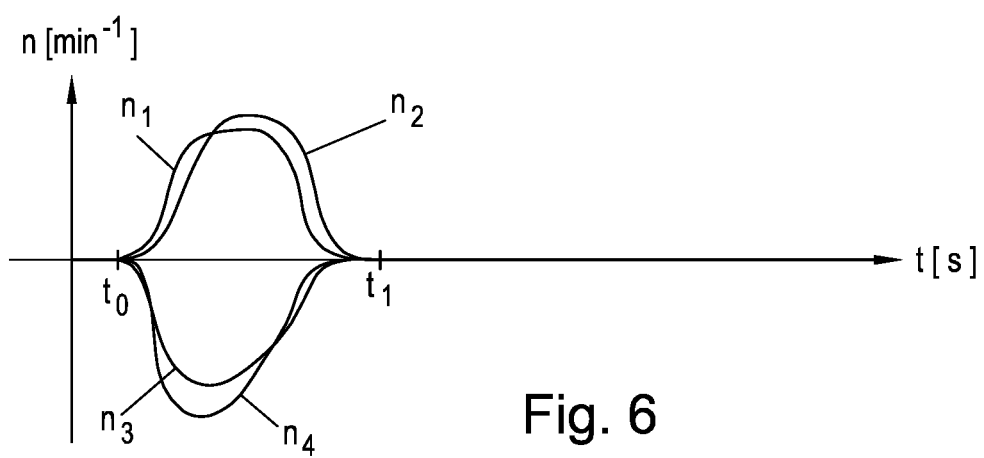

In the following, the present invention is described in greater detail with reference to FIGS. 1 to 6 which, by way of example, show schematic and non-limiting advantageous embodiments of the invention. In the drawings:

FIG. 1 shows a typical design of a wind power plant,

FIG. 2 shows an embodiment of an adjusting device with a drive axle as a wind direction tracking mechanism, FIG. 3 shows an arrangement of drive axles in the adjusting device, FIG. 4 shows an adjustment of the adjusting device for rotating the movable part, FIG. 5 shows an advantageous embodiment of the control of the drive axles, and FIG. 6 shows a tensioning of the drive axles for holding the movable part.

The present invention is described, without restricting the generality, using the example of an azimuth adjustment mechanism (wind direction tracking mechanism 7) for the nacelle 3 of a wind power plant 1. Of course, the invention can also be applied to other adjusting devices for a movable part of a wind power plant 1 in which at least two drive axles 11 are provided—for example, the rotor blade adjustment mechanism 6 for adjusting the position of the rotor blades 4.

FIG. 1 shows a typical wind power plant 1 having a fixed tower 2 on which the nacelle 3 is arranged. A drive train 8 is arranged on the nacelle 3, usually consisting of the rotor (hub 5 on which the rotor blades 4 are arranged) and a generator, which are connected to each other by shafts, the shaft of course being mounted accordingly. A transmission and possibly also a brake are often provided in the drive train 8 before the generator. The generator is driven by the rotor. The position of the rotor blades 4 can be adjusted by means of a rotor blade adjustment mechanism 6 as an adjusting device 10. Likewise, the nacelle 3 is arranged to be rotatable about the vertical axis 18 of the tower 2 by means of a wind direction tracking mechanism 7 as an adjusting device 10. The rotor blades 4 or the nacelle 3 thus constitute a movable part of the wind power plant 1 which, if necessary, can be adjusted—specifically, rotated—for example, in order to change the position of the rotor blades 4 according to the current wind, or to move the nacelle 3 to follow the current wind direction.

FIG. 2 shows a drive axle 11 of an adjusting device 10 of a movable part of a wind power plant 1, according to the invention—in this case, using the example of a wind direction tracking mechanism 7. The nacelle 3 is rotatably arranged on the tower 2 via a bearing 17—in this case, a roller bearing. The nacelle 3 is thus rotatably mounted about the vertical axis 18 of the tower 2. In addition, an adjustment brake 19 can be provided, for example having a stationary brake ring 25 on the tower 2 and, for example, having hydraulic, actuatable brake calipers 26 on the nacelle 3, which can interact with the brake ring 25 for braking. The drive shaft 11 is mechanically coupled to the movable part of the wind power plant 1 for the adjustment, for example in order to rotate the movable part. The bearing 17 can of course also be designed as a plain bearing, and the adjustment brake 19 can also be omitted.

The drive axle 11 consists of a drive motor 12 which drives a movable coupling part 27—in the embodiment shown, a drive pinion 14—as shown in FIG. 2. The drive motor 12 can be an electric motor, for example an asynchronous motor, such as a squirrel-cage motor, or a synchronous motor, such as a permanent magnet-excited or electromagnetically excited synchronous motor. The drive motor 12 can also be a hydraulic motor or any other suitable motor. A drive transmission 13, for example a planetary gearing, is usually also provided between the drive motor 12 and the coupling part 27 (drive pinion 14). For mechanical coupling, the drive pinion 14 interacts with a coupling part 28 arranged in a stationary manner on the tower 2—in the embodiment shown, a ring gear 16 having external teeth. When the drive pinion 14 is rotated, the nacelle 3 can consequently be rotated relative to the tower 2, for example in order for the nacelle 3 to track the direction of the wind. The adjusting device 10 consists of at least two such drive axles 11, each drive axle 11 acting on the same stationary coupling part 28 (ring gear 16). Of course, this arrangement is only an example and can also be designed in any other way. For example, the ring gear can be designed with an internal toothing. Likewise, the ring gear 16 can be arranged on the nacelle 3 (that is, it can be moved with the nacelle) and the drive axles 11 fixed on the tower 2. A drive motor 12 can also be designed with an electrical, pneumatic or hydraulic holding brake 23. In this way, a drive axle 11 can also be held independently of or in addition to an adjustment brake 19. The specific embodiment is not essential to the invention.

Instead of a drive pinion 14 and a ring gear 16 for mechanical coupling, other movable coupling parts 27 and stationary coupling parts 28 for mechanical coupling between the drive axle 11 and the movable part of the wind power plant 1 are of course also possible, for example friction wheels, belt drives or chain drives, each of which is driven by the drive motor 12.

According to the invention, at least two drive axles 11 are provided for the adjusting device 10, for example four drive axles 11-1, 11-2, 11-3, 11-4 as shown in FIG. 3 (wherein only the drive motors 12-1, 12-2, 12-3, 12-4 are illustrated, for the purpose of simplification).

As explained at the outset, there can be a large amount of mechanical play in a drive shaft 11, in particular the tooth play between the drive pinion 14 and the ring gear 16, and possible tooth play in the adjustment gear 13 or play in other mechanical couplings—as well as great elasticity, for example due to the translations and the torsional stiffness. In order to be able to transmit a rotary movement of the drive motor 12 to the movable part of the wind power plant 1, the play and the elasticities must first be overcome. For example, all the tooth flanks of all the active gears would first have to come into abutment in the direction of rotation. Only then can the movable part of the wind power plant 1, in this case the nacelle 3, be moved by a drive axle 11. However, this may require a large number of revolutions of the drive motor 12. This can lead to considerable problems in the movement and actuation of the adjusting device 10, in particular because large external, dynamic wind forces can act as a load of the adjusting device 10 at the same time.

A position control of the drive axles 11 can be used to solve this problem. The angular position of the drive motor 12 is controlled by the position control of a drive axle 11. A position control of a drive axle 11 is substantially characterized in that a position feedback from the drive motor 12 (or equivalent of another part of the drive axle 11) is provided, which in a drive control unit 24 (hardware and/or software), for example consisting of a drive amplifier 20 (hardware and/or software) and an adjustment control unit 21 (hardware and/or software) is processed to set the angular position of the drive motor 12 (or equivalent of another part of the drive axle 11). The drive amplifier 20 in this case can also be integrated into the drive motor 12. For position feedback, an angular position sensor 15 can be provided on the drive motor 12, delivering a sensor value M as the actual position value; based on this, the angle of rotation of the drive motor 12 can be deduced. Such angular position sensors 15 are well known in various designs—for example, as rotary encoders or resolvers. The drive amplifier 20 generates the required manipulated variables for the drive motor 12, for example electrical power for an electrical drive motor 12, for example three-phase voltages U, V, W for a three-phase electric motor as the drive motor 12, in order to implement the desired rotary movement at any time. Of course, other manipulated variables can be used for other types of drive motors 12, for example actuating commands for hydraulic valves or for a hydraulic pump in the case of a hydraulic motor. The drive amplifier 20 can also process control signals S for position control, which are provided, for example, by an adjustment control unit 21 (hardware and/or software). The drive control unit 24, or an adjustment control unit 21, can in turn be controlled by a system controller 22 of the wind power plant 1. The drive control unit 24 or adjustment control unit 21 can of course also be implemented in the system controller 22, for example as software. The adjustment control unit 21 and the drive amplifier 20 can be implemented as shared hardware. It is also possible to implement the adjustment control unit 21, the drive amplifier 20 and the system controller 22 as shared hardware. Likewise, several drive amplifiers 20 can be implemented in shared hardware that is actuated by an adjustment control unit 21. In an advantageous embodiment, an adjustment control unit 21 is provided which has at least one drive amplifier 20-1, 20-2, 20-3, 20-4, a group of drive amplifiers 20-1, 20-2, 20-3, 20-4, or drives all of the drive amplifiers 20-1, 20-2, 20-3, 20-4 of the drive axles 11-1, 11-2, 11-3, 11-4. The drive control unit 24-1, 24-2, 24-3, 24-4 of each drive axle 11-1, 11-2, 11-3, 11-4 then consists, for example, of the same adjustment control unit 21 and one of the drive amplifiers 20-1, 20-2, 20-3, 20-4. A drive amplifier 20 and/or an adjustment control unit 21, or generally the drive control unit 24, can also control any holding brake 23 of the drive motor 12 that may be present.

The method of the adjusting device 10 according to the invention will be explained with reference to FIG. 4 using the example of an adjusting device 10 having four drive axles 11-1, 11-2, 11-3, 11-4 (as in FIG. 3).

At the beginning of the adjustment, any existing holding brakes 23 of the drive motors 12-1, 12-2, 12-3, 12-4 are preferably closed and any adjustment brakes 19 that are present are closed. At time $t_0$, the higher-level system controller 22 issues the command B for the adjustment to the drive control unit 24-1, 24-2, 24-3, 24-4 of the drive axles 11-1, 11-2, 11-3, 11-4—in the embodiment described, to the adjustment control unit 21—which actuates at least one drive amplifier 20-1, 20-2, 20-3, 20-4. Subsequently, any existing and closed holding brakes 23 are released as a preparatory action.

As a first step of the method according to the invention, the drive axles 11-1, 11-2, 11-3, 11-4 are tensioned prior to the actual adjustment, preferably when the movable part of the wind power plant 1 is at a standstill. For this purpose, at least one drive axle 11-1 is rotated relative to the other drive axles 11-2, 11-3, 11-4. For example, at least one drive axle 11-1 can be moved in the direction of rotation opposite that of the other drive axles 11-2, 11-3, 11-4 for the tensioning. Alternatively, tensioning can be implemented by rotating all the drive axles 11-1, 11-2, 11-3, 11-4 in the same direction of rotation, wherein at least one drive axle 11-1 is rotated more slowly than the other drive axles 11-2, 11-3, 11-4, or by holding at least one drive axle 11-1 while the other drive axles 11-2, 11-3, 11-4 are rotated—preferably, but not necessarily, in the same direction of rotation. Of course, these options for tensioning can also be combined. In the tensioned state, the drive motors 12-1, 12-2, 12-3, 12-4 cannot be turned any further with a certain, prespecified or configured torque with which the play and the elasticities have been overcome. This torque is of course limited by the drive motors 12-1, 12-2, 12-3, 12-4 and/or components of the drive axles 11-1, 11-2, 11-3, 11-4 to prevent damage or overload.

The tensioning can in principle be performed in any arbitrary manner—for example, with a rotation speed control, torque control or position control of the drive axles 11-1, 11-2, 11-3, 11-4 in the drive control unit 24-1, 24-2, 24-3, 24-4. If a desired torque for tensioning is to be set for each drive axle 11-1, 11-2, 11-3, 11-4, then a torque control is preferably used—that is, the drive amplifiers 20-1, 20-2, 20-3, 20-4 of the drive axles 11-1, 11-2, 11-3, 11-4 set a desired tensioning torque, for example a tensioning torque which is prespecified or configured by the adjustment control unit 21 or the system controller 22. In this case, the total torque of all the generated drive torques of the individual drive axles 11-1, 11-2, 11-3, 11-4 can be required to be non-zero. A residual torque can also be set against the desired direction of rotation of the movable part, which then serves as a braking torque in order to act as a damping against the externally acting wind. During the tensioning, the drive axles 11-1, 11-2, 11-3, 11-4 are rotated until the mechanical play and the elasticities are overcome, which could also be achieved with a speed or position control.

In the example in FIG. 4, the speeds $n_1$, $n_2$, $n_3$, $n_4$ of the four drive axles 11-1, 11-2, 11-3, 11-4 are shown. It can be seen that the first drive axle 11-1 sets a speed $n_1$ which is opposite to the speeds $n_2$, $n_3$, $n_4$ of the other drive axles 11-2, 11-3, 11-4. In the tensioned state, the drive motors 12-1, 12-2, 12-3, 12-4 cannot be rotated any further with a certain, predetermined or configured torque, which is why the speeds $n_1$, $n_2$, $n_3$, $n_4$ of the four drive axles 11 drop to zero.

In the tensioned state, the adjustment brake 19, if present, is released, which can take a few seconds depending on the configuration. It should be noted here that the tensioning itself can also be carried out with the adjustment brake 19 released or not present. The actual adjustment process is initiated at time $t_1$—for example by the system controller 22. At this point in time, at the latest, the drive axles 11-1, 11-2, 11-3, 11-4 are switched to position control—although preferably before that, for example after the tensioning process has been completed. The position is controlled in such a manner that the tensioning is maintained. For this purpose, all the drive axles 11-1, 11-2, 11-3, 11-4 are adjusted together while maintaining the tensioning in the same direction of rotation. The tensioning of the drive axles 11-1, 11-2, 11-3, 11-4 should preferably not decrease—at least not too strongly; however, it can increase. This happens, for example, in such a way that the relative positions of the drive axles 11-1, 11-2, 11-3, 11-4 with respect to each other remain unchanged due to the position control. During the adjustment, the drive axles 11-1, 11-2, 11-3, 11-4 are moved substantially by the same angle of rotation in the same direction of rotation. "Substantially" is used here because, due to unavoidable control inaccuracies, measurement inaccuracies, manufacturing-related deviations in the drive axles 11-1, 11-2, 11-3, 11-4, etc., the angles of rotation in the individual drive axles 11-1, 11-2, 11-3, 11-4 usually will not match exactly.

In order to improve the position control, a master/slave control can also be implemented, which is explained with reference to FIG. 5. FIG. 5 shows the four drive axles 11-1, 11-2, 11-3, 11-4 of the exemplary embodiment, each with a drive amplifier 20-1, 20-2, 20-3, 20-4 and the associated drive motor 12-1, 12-2, 12-3, 12-4 (further components of the drive train, such as the drive transmission 13, are not shown for reasons of simplicity). One drive axle 11-1, 11-2, 11-3, 11-4 is defined as the master drive axle 11-2 and receives the position setpoint $S_P$ from the adjustment control unit 21. The other drive axles 11-1, 11-3, 11-4 receive the respective position setpoint $S_S$ from the drive amplifier 20-2 of the master drive axle 11-2. The position setpoint $S_S$, which is passed on from the master drive axle 11-2 to the slave drive axles 11-1, 11-3, 11-4 is advantageously the actual angle value $M_M$ detected with the angular position sensor 15 of the master drive motor 12-2. The slave drive axles 11-1, 11-3, 11-4 thus exactly follow the movement of the master drive axle 11-2. However, it is also possible for more than one master drive axle 11-2 to be provided, with a number of slave drive axles 11-1, 11-3, 11-4 being assigned to each master drive axle 11-2. Each master drive axle 11-2 with its slave drive axles 11-1, 11-3, 11-4 is then controlled as described.

In a further embodiment, the position setpoint $S_P$ can also be relayed by the adjustment control unit 21 to all the slave drive axles 11-1, 11-3, 11-4 for their control.

However, a combination can also be contemplated in which at least one master drive axle 11-2 with at least one slave drive axle 11-1, 11-3, 11-4 is provided, and other slave drive axles 11-1, 11-3, 11-4 receive the position setpoint $S_P$ directly.

To implement the control, the drive amplifiers 20-1, 20-2, 20-3, 20-4 of the drive axles 11-1, 11-2, 11-3, 11-4 can be connected to each other and/or to the adjustment control unit 21 using a suitable communication bus, for example a POWERLINK or CAN, for data communication.

Using the position setpoints $S_P$, $S_S$, for example in the form of angles of rotation, and the detected sensor values M (or the angles of rotation derived therefrom) as actual values of the control, the required control variables, e.g. electrical power U, V, W, which are required so that the actual position values follow the position setpoints, are then calculated in the drive amplifier 20 utilizing a controller—which is, for example, usually implemented as software (such as in a PID controller). Instead of electrical power, another variable can be calculated as a manipulated variable in the drive amplifier 20—for example, a duty cycle or pulse/pause ratio in a known PWM (pulse width modulation) control—which is then converted into electrical power in the drive motor 12 itself. In this case, the control and the power electronics (to provide the electrical power) can also be separated. Such a position control in a drive is well known, which is why it need not be discussed in more detail.

For position control of all the drive axles 11-1, 11-2, 11-3, 11-4 for adjusting the adjusting device 10, the adjustment control unit 21 prespecifies a position setpoint $S_P$ which is implemented by the drive axles 11-1, 11-2, 11-3, 11-4—for example, as explained with reference to FIG. 5. The position setpoint $S_P$ of course corresponds to the value that is required to turn the movable part of the wind power plant 1 to the desired end position $\varphi_S$—for example by 10° in the desired direction—by means of the adjusting device 10.

The implementation can again be done in different ways. For example, a speed ramp can be configured in the master drive amplifier 20-2 in order to implement the position specification—for example, as shown in FIG. 4. For this purpose, the master drive axle 11-2 can first be accelerated at time $t_1$ at a prespecified or configured acceleration—for example, a maximum possible acceleration—until a prespecified or configured adjustment speed $n_v$ has been reached. A slave drive axle 11-1, 11-3, 11-4 follows this master movement as described above. Of course, all or certain drive axles 11-1, 11-2, 11-3, 11-4 could also receive the position setpoint $S_P$ from the system controller 21 and implement it with the same speed ramp. Instead of a speed ramp, any other speed profile could of course also be implemented. The drive axles 11-1, 11-2, 11-3, 11-4 are decelerated via the configured or prespecified speed ramp in sufficient time for the desired end position $\varphi_S$, for example a desired angle of rotation, to be reached at the end of the speed ramp. Such speed ramps, or any other speed profile, are easy to calculate.

Alternatively, the adjustment control unit 21 can of course also implement the desired speed profile and specify the rotation angles to be set for the drive amplifiers 20 in predetermined time steps, for example in the millisecond range. A master/slave configuration can again be implemented in which only the master drive amplifier 20-2 receives the angle of rotation to be set and the slave drive axles 11-1, 11-3, 11-4 follow as before; or, all the drive amplifiers 20-1, 20-2, 20-3, 20-4 can again receive the rotation angle from the adjustment control unit 21.

However, it is also possible that the system controller 22 of the adjustment control unit 21 (or the drive amplifiers 20-1, 20-2, 20-3, 20-4) merely gives the command for adjustment in the desired direction of rotation, and the drive axles 11-1, 11-2, 11-3, 11-4 then accelerate with a certain speed profile until the adjustment speed $n_v$ is reached, and then continue to rotate at the adjustment speed $n_v$ until the system controller 22 gives the command to stop. A corresponding speed profile can then be implemented or configured for stopping—for example, braking with maximum deceleration to a standstill. Again, this can also preferably be implemented in a master/slave configuration of the drive axles 11-1, 11-2, 11-3, 11-4.

As can be seen in FIG. 4, the speeds $n_1$, $n_2$, $n_3$, $n_4$ of the drive motors 12-1, 12-2, 12-3, 12-4 are substantially the same (within the achievable accuracy) in the adjustment with position control, because substantially the same angles of rotation are adjusted in order to maintain the tensioning of the drive axles 11-1, 11-2, 11-3, 11-4.

At time $t_2$, the drive motors 12-1, 12-2, 12-3, 12-4 of the drive axles 11-1, 11-2, 11-3, 11-4 were brought to a standstill, thus completing the adjustment movement.

Thereafter, the holding brake 23 of the drive motors 12-1, 12-2, 12-3, 12-4 and/or the adjustment brake 19 of the adjusting device 10, if present, can be closed.

In an advantageous embodiment of the invention, the drive axles 11-1, 11-2, 11-3, 11-4 are tensioned once again prior to the actual adjustment, i.e. before time $t_1$. Between the initial tensioning and the actual adjustment, for example while the adjustment brake 19 is being opened, an uncontrolled adjustment of the adjusting device 10 can occur due to the externally acting wind load. This can undesirably change the state of tensioning, which can have a negative impact on the subsequent adjustment. In order to prevent this, a drive axle 11-1, or also several or all the drive axles 11-1, 11-2, 11-3, 11-4, can be tensioned once again in order to restore a defined tensioning state—for example, a desired total torque. In the embodiment according to FIG. 4, the first drive axle 11-1 is tensioned again by the drive motor 12-1 of the first drive axle 11-1 being activated again in the predetermined direction of rotation, until the desired tensioning state is reached.

A further advantage of the invention can be seen in that the holding of the movable part of the wind power plant 1 is possible using only the drive axles 11-1, 11-2, 11-3, 11-4 of the adjusting device 10. In particular, an adjustment movement in spite of the wind is thus possible with the adjustment brake 19 of the adjusting device 10 fully open. However, it can also be used to hold the movable part of the adjusting device 10, as explained below.

As already stated, the movable part can be braked by an adjustment brake 19 and/or by the friction in a plain bearing as a bearing 17, and/or by means of holding brakes 23 in the drive axles 11-1, 11-2, 11-3, 11-4. In all cases, it may happen that the external wind load becomes so great—for example, in the case of a typhoon at an offshore wind power plant—that the braking torque applied is overcome and the movable part of the wind power plant 1 is rotated in an uncontrolled manner by the acting wind. This is exacerbated by the inevitable wear in an adjustment brake 19 or holding brake 23, because the braking action can decrease with increasing wear. In order to solve or at least alleviate this problem, the drive axles 11-1, 11-2, 11-3, 11-4 can also be used according to the invention for holding the movable part, for example for braking support.

For holding, it is assumed that the drive axles 11-1, 11-2, 11-3, 11-4 are tensioned at the start of the holding, at time $t_1$, as described above. For holding, it is advantageous to divide the drive axles 11-1, 11-2, 11-3, 11-4 preferably evenly during the tensioning—that is, for example, to rotate the same number of drive axles 11-1, 11-2 in one direction and the same number in the other direction, because the wind can rotate the movable part in both directions. In the case of four drive axles 11-1, 11-2, 11-3, 11-4, as in FIG. 3, two drive axles 11-1, 11-2 would preferably be rotated in one direction for tensioning and the other two drive axles 11-3, 11-4 would be rotated in the other direction, as shown in FIG. 6. Likewise, a total torque of zero is preferably set to hold the movable part during the tensioning.

When the drive axles 11-1, 11-2, 11-3, 11-4 are tensioned, the set tensioning of the drive axles 11-1, 11-2, 11-3, 11-4 is now maintained by the control to hold the movable part (again within the achievable accuracy). This is done with a position control. As long as the tensioning is maintained, the movable part of the wind power plant 1 will not move. During the control used for maintaining the tensioning, the drive axles (11-1, 11-2, 11-3, 11-4) can subsequently move in order to compensate for any external disturbance of the tensioning caused by the wind.

However, if the external force due to the acting wind is too great, such that the tensioning is overcome by the wind, the movable part may then move. The holding can therefore only be ensured up to a certain wind load, which in turn depends on the set tensioning state. Such a movement of the movable part can be accepted or can be corrected again by the control. For example, a higher-level control of the position of the movable part could be provided in the drive control unit 24-1, 24-2, 24-3, 24-4, and be used to move to the initial position of the movable part at the beginning of the holding process. This movement could be implemented as described above for adjusting the movable part.

For example, for each drive axle 11-1, 11-2, 11-3, 11-4, a target position can be specified as the position setpoint $S_P$, which corresponds to the initial position at the start of the holding or after the tensioning. For this purpose, for example, the respective initial position can be prespecified to each of the drive axles 11-1, 11-2, 11-3, 11-4 as the position setpoint $S_P$. The drive axles 11-1, 11-2, 11-3, 11-4 are thus held in the initial position by the position control, and any external disturbances caused by wind are accordingly corrected. If, despite the activated drive axles 11-1, 11-2, 11-3, 11-4, there is an unwanted rotation of the movable part due to the acting wind, the position control can be used to restore the initial position and correct a rotation of the movable part. However, the control can also be based on the relative positions of the drive axles 11-1, 11-2, 11-3, 11-4 with respect to each other—which would make possible any rotation of the movable part. Such a rotation of the movable part could be compensated for by a higher-level control of the position of the movable part.

The movable part can also be held when the adjusting brake 19 is closed, which would support the adjustment brake 19. If the movable part is held when the adjustment brake 19 is open, or in an adjusting device 10 without an adjustment brake 19, the drive axles 11-1, 11-2, 11-3, 11-4 alone can generate the braking effect for holding the movable part against the acting wind.

The goal is to hold the movable part of the adjusting device 10 against the acting wind by means of the drive axles 11-1, 11-2, 11-3, 11-4—which is possible up to a certain wind load.

Since the drive motors 12-1, 12-2, 12-3, 12-4 are typically cooled with a fan on the motor shaft, which does not rotate at standstill, or only rotates slowly at low speeds, the temperature of the drive motors 12-1, 12-2, 12-3, 12-4 can preferably also be monitored to avoid thermal overload. In order to keep the thermal load on the drive motors 12-1, 12-2, 12-3, 12-4 as low as possible, the holding brakes 23 can be closed again if no control intervention is required. It is also conceivable to signal a warning of thermal overload to the system controller 22 and/or the adjustment control unit 21. In this case, the holding of the drive axles 11-1, 11-2, 11-3, 11-4 can be interrupted.

To perform the holding of the drive axles 11-1, 11-2, 11-3, 11-4, the system controller 22 can issue a holding command to the drive control unit 24, or to the adjustment control unit 21 of the drive control unit 24. The drive control unit 24 then ensures that the drive axles 11-1, 11-2, 11-3, 11-4 are tensioned, provided that these are not already in the tensioned state. The tensioning is performed, for example, as described above. By way of example, after the tensioning or after the command to hold is received, the initial positions of all the drive axles 11-1, 11-2, 11-3, 11-4 are stored and held by the position control up to a configured maximum torque of the drive motors 12-1, 12-2, 12-3, 12-4, which can also reach the maximum torque of the drive transmission 13-1, 13-2, 13-3, 13-4 and/or the maximum torque to be transmitted.

This holding can also compensate, by means of the drive axles 11-1, 11-2, 11-3, 11-4, for braking function lost due to wear and tear. In addition, a braking system of the wind power plant, for example an adjustment brake 19, can also be smaller by design, and therefore more cost-effective.

The invention claimed is:

1. A method for holding a movable part of a wind power plant having an adjusting device, wherein the adjusting device comprises at least two drive axles, each having a drive motor, which is mechanically coupled to the movable part, the method comprising:
   tensioning the drive axles against each other by rotating at least one drive axle relative to the other drive axles to achieve positions for the drive axles at a beginning of a holding action, and
   maintaining the holding action by maintaining the tensioning of the drive axles via a feedback from the drive motor as a position control of the drive axles to hold the drive axles in the positions at the beginning of the holding action.

2. The method according to claim 1, wherein the tensioning is carried out by rotating at least one drive axle in the direction of rotation opposite that of the other drive axles.

3. The method according to claim 1, wherein the tensioning is carried out by rotating all the drive axles in the same direction of rotation, wherein at least one drive axle is rotated more slowly than the other drive axles.

4. The method according to claim 1, wherein the tensioning is carried out by holding at least one drive axle while the other drive axles are rotated.

5. The method according to claim 1, wherein, during tensioning, a total torque, as the sum of the individual drive torques of the drive axles, is set to zero.

6. The method according to claim 1 wherein the drive axles are re-tensioned before the holding action is initiated.

7. The method according to claim 1, wherein, during the tensioning of the drive axles against each other, the drive axles and the movable part are movable.

8. The method according to claim 1, wherein, while maintaining the holding action, the movable part is held in place.

9. A wind power plant comprising:
   an adjusting device for holding a movable part of the wind power plant, the adjusting device comprising at least two drive axles, each having a drive motor, which is mechanically coupled to the movable part;
   a drive control unit which rotates at least one drive axle relative to the other drive axles for tensioning the drive axles against each other to positions at a beginning of a holding action and which maintains the holding action by maintaining the tensioning via a feedback from the drive motor as a position control of the drive axles in the positions at the beginning of the holding action.

10. The wind power plant according to claim 9, wherein the adjusting device is a wind direction tracking mechanism or a rotor blade adjustment mechanism.

* * * * *